United States Patent
Amarnath et al.

(10) Patent No.: US 10,860,242 B1
(45) Date of Patent: Dec. 8, 2020

(54) METHOD FOR AUTOMATIC INSTANT ACCESS MOUNT POINT CLEANUP

(71) Applicant: EMC IP Holding Company LLC, Hopkinton, MA (US)

(72) Inventors: Mohan Amarnath, Bangalore (IN); Suraj Vithalkar, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 15/727,268

(22) Filed: Oct. 6, 2017

(51) Int. Cl.
*G06F 3/06* (2006.01)
*G06F 9/44* (2018.01)
*G06F 9/4401* (2018.01)

(52) U.S. Cl.
CPC ............ *G06F 3/0652* (2013.01); *G06F 3/067* (2013.01); *G06F 3/0619* (2013.01); *G06F 3/0647* (2013.01); *G06F 3/0664* (2013.01); *G06F 9/4401* (2013.01)

(58) Field of Classification Search
CPC .... G06F 3/0652; G06F 3/0619; G06F 3/0647; G06F 3/0664; G06F 3/067; G06F 9/4401; G06F 3/0623
See application file for complete search history.

(56) References Cited

U.S. PATENT DOCUMENTS

| | | | |
|---|---|---|---|
| 8,838,913 B1* | 9/2014 | Conover | G06F 9/45558 711/154 |
| 9,740,577 B1* | 8/2017 | Chakraborty | G06F 11/1469 |
| 2007/0260831 A1* | 11/2007 | Michael | G06F 9/4401 711/162 |
| 2011/0066597 A1* | 3/2011 | Mashtizadeh | G06F 3/0617 707/640 |
| 2015/0205638 A1* | 7/2015 | Motoki | G06F 9/5088 711/162 |
| 2015/0378831 A1* | 12/2015 | Tarasuk-Levin | G06F 11/1484 714/15 |
| 2018/0018109 A1* | 1/2018 | Mueller | G06F 3/0619 |

* cited by examiner

*Primary Examiner* — Masud K Khan
(74) *Attorney, Agent, or Firm* — Womble Bond Dickinson (US) LLP

(57) ABSTRACT

One embodiment is related to a method for automatically removing a mount point, comprising: determining whether a vMotion live migration has been completed for a virtual machine (VM) recovered through Instant Access from a backup storage system; after the vMotion live migration has been completed, determining whether a datastore corresponding to a backup image of the VM on the backup storage system is empty; in response to determining that the datastore corresponding to the backup image of the VM on the backup storage system is empty, removing automatically a mount point corresponding to the datastore; and after removing the mount point, freeing up storage space on the backup storage system corresponding to the datastore.

15 Claims, 3 Drawing Sheets

METHOD FOR AUTOMATIC INSTANT ACCESS MOUNT POINT CLEANUP

FIELD OF THE INVENTION

Embodiments of the disclosure are related to electronic devices, and more particularly, to a method, apparatus, and system for automatically removing a mount point after virtual machine image live migration.

BACKGROUND

Often computer systems are configured to perform many separate and independent tasks. In order to efficiently and cleanly allocate resources to the various tasks, many enterprises run a plurality of separate virtual machines (VMs) in parallel on a single production server computer in a virtualized and distributed environment. Example systems for executing multiple VMs on servers include the ESX, ESXi, and vSphere products distributed by VMware, Inc.

Backing up a virtual machine by creating a virtual machine image ensures that the virtual machine itself can be restored. Backing up the guest operating system and the applications running on the guest operating system enables the restoration of these services. The backup image may be stored at a deduplicated backup storage system having a set of storage units (e.g., a Dell EMC Data Domain system).

A technique known as Instant Access allows a backed up VM image to be booted directly from the backup storage system. Instant Access is especially useful when a production VM crashes due to a critical error, as Instant Access allows the services on the VM to be restored with minimal delay. Instant Access has been incorporated into, for example, the Dell EMC Avamar application.

Usually, after the backed up VM image has been booted from the backup storage system, it is migrated from the backup storage system to the production server. A technique known as Storage vMotion (or vMotion for short) (e.g., available from VMWare, Inc.) enables the live migration of the VM image. In other words, with vMotion, the VM can keep running while the migration of the VM image is in progress.

Typically, when Instant Access is initiated, the VM image stored at the backup storage system is mounted at the production server as a datastore (e.g., a Network File System "NFS" datastore). Once the vMotion migration is complete, the mount point is no longer required. However, currently the mount point is not automatically removed. The presence of the mount point may prevent another Instant Access from being initiated, and may prevent space on the backup storage system from being freed up. Presently manual intervention by the user is required to remove the mount point.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Embodiments of the invention are related to a method for automatically removing a mount point, comprising: determining whether a vMotion live migration has been completed for a virtual machine (VM) recovered through Instant Access from a backup storage system; after the vMotion live migration has been completed, determining whether a datastore corresponding to a backup image of the VM on the backup storage system is empty; in response to determining that the datastore corresponding to the backup image of the VM on the backup storage system is empty, removing automatically a mount point corresponding to the datastore; and after removing the mount point, freeing up storage space on the backup storage system corresponding to the datastore.

Figure 1:
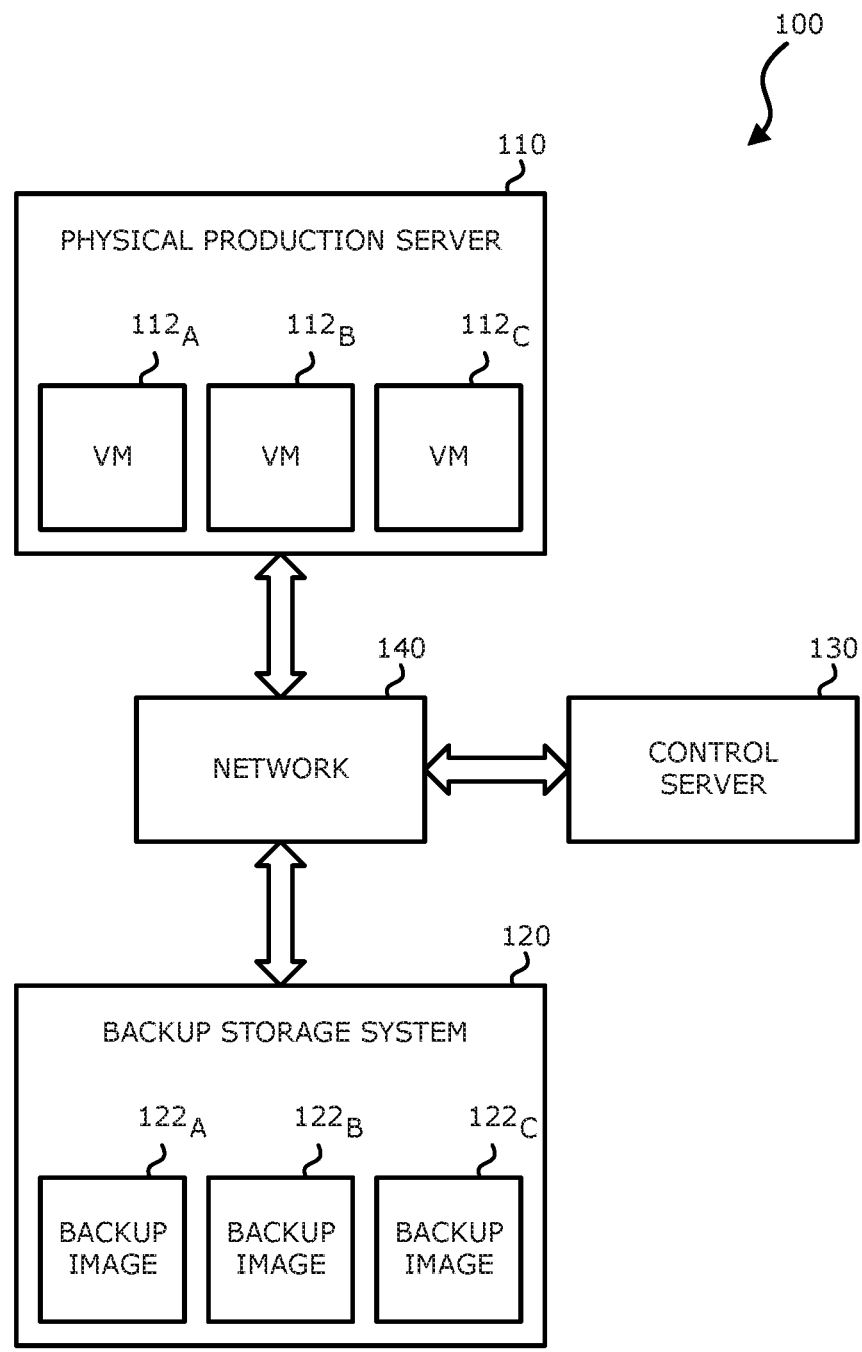
FIG. 1 is a block diagram illustrating an example environment in which embodiments of the invention may be practiced.

Referring to FIG. 1, a block diagram illustrating an example environment 100 in which embodiments of the invention may be practiced is shown. The environment 100 comprises a physical production server 110, a backup storage system 120, and a control server 130. The physical production server 110 may host a virtualized environment that hosts one or more VMs 112. The physical production server 110 including the VMs 112, the backup storage system 120, the control server 130 may communicate with each other via a network 140. It should be appreciated that although 3 VMs 112 are illustrated in FIG. 1, the number of VMs 112 hosted by the physical production server 110 does not limit the invention. The control server 130 may have applications installed thereon that enable it to manage the physical production server 110 and the backup storage system 120 (e.g., vCenter from VMWare for managing the virtualized environment hosted on the physical production server 110, and Avamar from Dell EMC for managing the backup storage system 120). In one embodiment, the control server 130 itself may also be virtualized.

The disk images of the VMs 112 (e.g., Virtual Machine Disk "VMDK" files) may be backed up to the backup storage system 120 from time to time and/or according to a preset schedule. In other words, the backup storage system 120 may store one or more backup images 122 for the VMs 112. When one of the VMs 112 (e.g., VM 112C) crashes and is not recoverable by rebooting, an Instant Access may be performed to boot the backup image 122 of the crashed VM 112 in order to restore the operation of the crashed VM 112 in as little time as possible.

In particular, under the coordination of the control server 130, the backup image 122 of the crashed VM 112 is mounted at the physical production server 110 as a datastore (e.g., an NFS datastore), and the backup image 122 is booted up in a virtualized environment directly from the backup storage system 120. Thereafter, a vMotion migration may be performed to migrate the live backup image 122 from the backup storage system 120 to the physical production server 110.

Once the vMotion migration is complete, the mount point is no longer required, and the space on the backup storage system 120 hitherto occupied by the image 122 of the crashed VM 112 can be freed up. However, currently the mount point is not automatically removed. The presence of the mount point may prevent another Instant Access from being initiated, and may prevent space on the backup storage system 120 from being freed up.

Therefore, in one embodiment of the invention, after the vMotion migration is complete, the mount point may be automatically removed.

Figure 2:
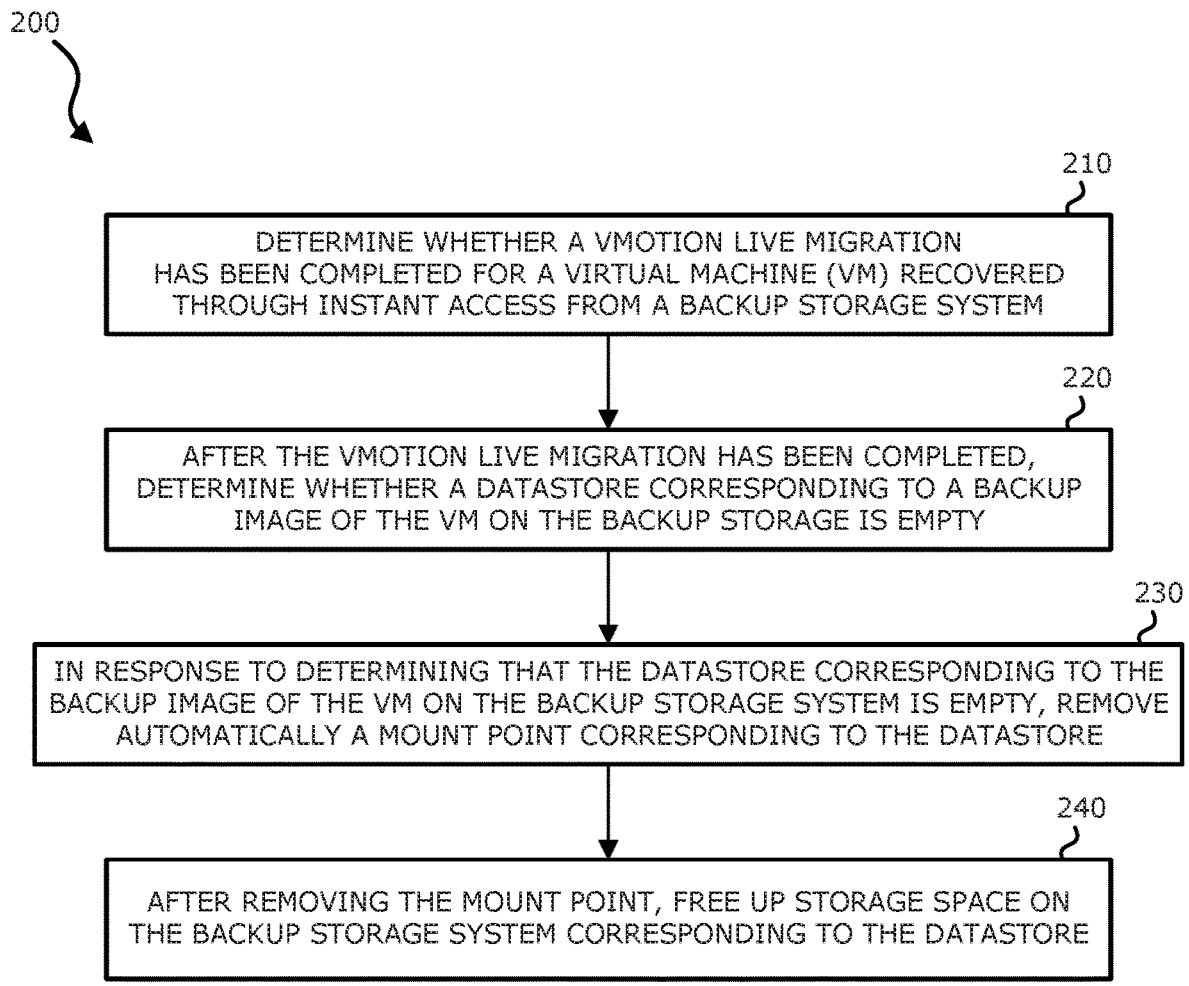
FIG. 2 is a flowchart illustrating an example method for automatically removing a mount point.

Referring to FIG. 2, a flowchart illustrating an example method 200 for automatically removing a mount point is shown. At block 210, whether a vMotion live migration has been completed for a VM recovered through Instant Access from a backup storage system may be determined. If a vMotion live migration has not been initiated, the user may be prompted to initiate the vMotion live migration to migrate the VM image from the backup storage system to the physical production server (or a primary storage system connected to the physical production server). If the vMotion live migration has been initiated but has not been completed, the process may wait for its completion. At block 220, after the vMotion live migration has been completed, whether the datastore corresponding to a backup image of the VM on the backup storage system is empty may be determined. If the datastore corresponding to the backup image of the VM on the backup storage system is not empty, the user may be prompted to free up contents of the datastore. At block 230, in response to determining that the datastore corresponding to the backup image of the VM on the backup storage system is empty, a mount point corresponding to the datastore may be removed automatically. In one embodiment, the removal of the mount point may be performed through a management console (e.g., Dell EMC Avamar Management Console). At block 240, after removing the mount point, storage space on the backup storage system corresponding to the datastore may be freed up.

In one embodiment, if the datastore corresponding to the backup image of the VM on the backup storage system and/or its contents is inaccessible, the mount point at the physical production server corresponding to the datastore may be forcibly removed.

Method 200 may be performed by processing logic that includes hardware (e.g. circuitry, dedicated logic, etc.), software (e.g., embodied on a non-transitory computer readable medium), or a combination thereof. For example, method 200 may be performed by processors 1501 of FIG. 3. Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Therefore, the Instant Access feature can bring back a downed application from backup storage in a short timeframe. But the manual removal of mount points is a time consuming task. Embodiments of the invention help eliminate the task. This prevents performance of the backup storage system from being degraded, and allows additional instances of Instant Access to be initiated. Further, automatic removal of the datastore frees up space on the backup storage system, and also improves the performance of the backup storage system.

As the data grows, the need for service, security, and protection also grows. The cost for data protection also grows. Embodiments of the invention help users in a great way without compromises on costs or hardware. Storage spaces and time may be automatically saved without compromising on performance. The whole system is automatically ready to serve another Instant Access request with minimal user intervention.

Figure 3:
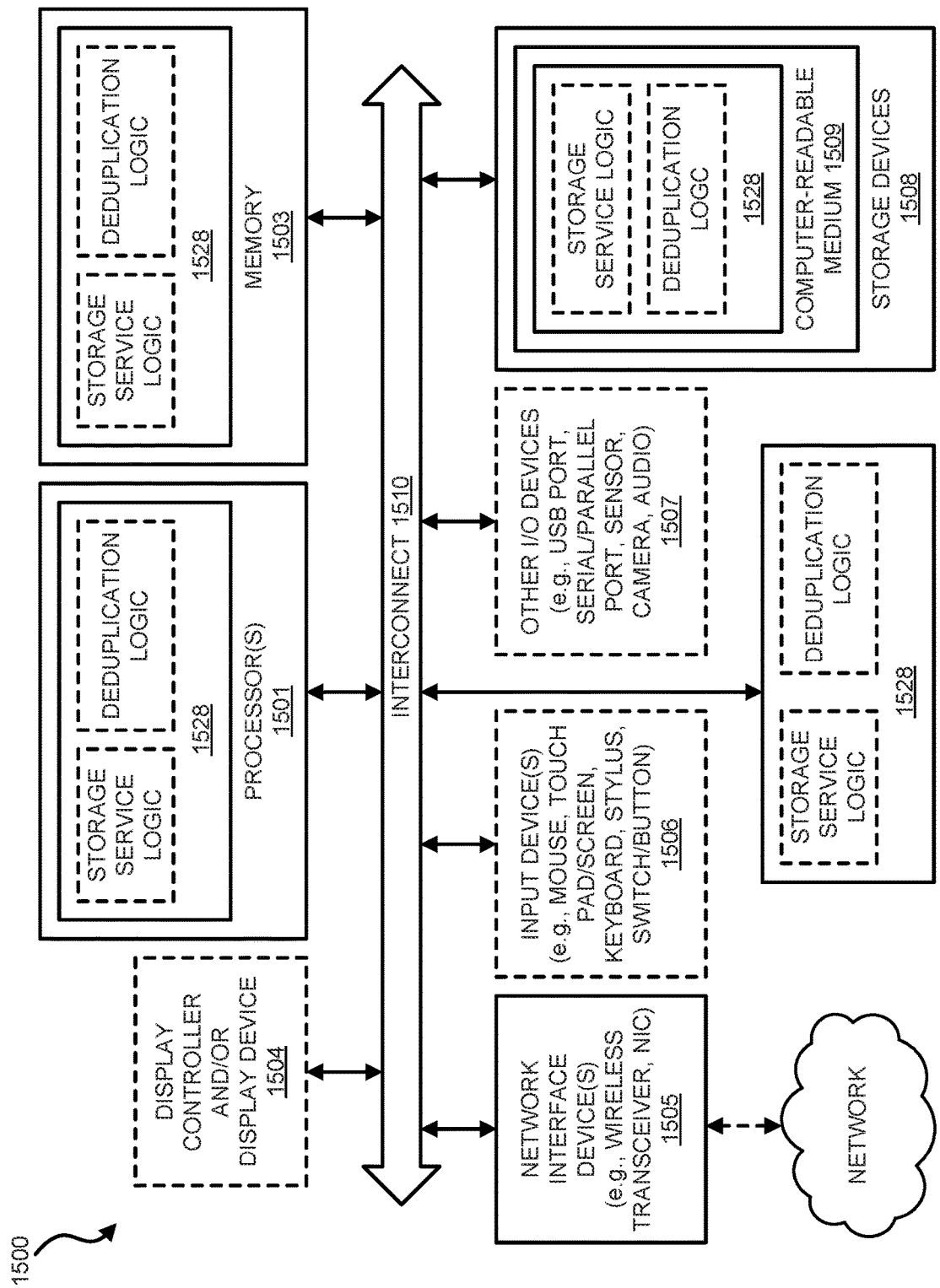
FIG. 3 is a block diagram illustrating an example of a data processing system which may be used with one embodiment of the disclosure.

FIG. 3 is a block diagram illustrating an example of a data processing system 1500 which may be used with one embodiment of the disclosure. For example, system 1500 may represent any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for automatically removing a mount point, comprising:
   determining whether a vMotion live migration has been completed for a virtual machine (VM) recovered through Instant Access from a backup storage system;
   after the vMotion live migration has been completed, determining whether a datastore corresponding to a backup image of the VM on the backup storage system is empty, wherein in response to the datastore corresponding to the backup image of the VM on the backup storage system being not empty, a user is prompted to free up contents of the datastore;
   in response to determining that the datastore corresponding to the backup image of the VM on the backup storage system is empty, removing automatically a mount point corresponding to the datastore, wherein prior to the removal of the mount point, the backup image was mounted at a production server over a network as the datastore at the mount point, wherein if the datastore corresponding to the backup image of the VM on the backup storage system and/or its contents is inaccessible, the mount point corresponding to the datastore is forcibly removed; and
   after removing the mount point, freeing up storage space on the backup storage system corresponding to the datastore.

2. The method of claim 1, wherein if the vMotion live migration has not been initiated, a user is prompted to initiate the vMotion live migration to migrate the backup image of the VM from the backup storage system to the production server.

3. The method of claim 1, wherein the recovered VM keeps running during the vMotion live migration.

4. The method of claim 1, wherein Instant Access enables booting of the VM directly from the backup storage system.

5. The method of claim 1, wherein the datastore is a Network File System (NFS) datastore.

6. A non-transitory machine-readable medium having instructions stored therein which, when executed by a processor, cause the processor to perform recovery operations, the operations comprising:
   determining whether a vMotion live migration has been completed for a virtual machine (VM) recovered through Instant Access from a backup storage system;
   after the vMotion live migration has been completed, determining whether a datastore corresponding to a backup image of the VM on the backup storage system is empty, wherein in response to the datastore corresponding to the backup image of the VM on the backup storage system being not empty, a user is prompted to free up contents of the datastore;
   in response to determining that the datastore corresponding to the backup image of the VM on the backup storage system is empty, removing automatically a mount point corresponding to the datastore, wherein prior to the removal of the mount point, the backup image was mounted at a production server over a network as the datastore at the mount point, wherein if the datastore corresponding to the backup image of the VM on the backup storage system and/or its contents is inaccessible, the mount point corresponding to the datastore is forcibly removed; and
   after removing the mount point, freeing up storage space on the backup storage system corresponding to the datastore.

7. The non-transitory machine-readable medium of claim 6, wherein if the vMotion live migration has not been initiated, a user is prompted to initiate the vMotion live migration to migrate the backup image of the VM from the backup storage system to the production server.

8. The non-transitory machine-readable medium of claim 6, wherein the recovered VM keeps running during the vMotion live migration.

9. The non-transitory machine-readable medium of claim 6, wherein Instant Access enables booting of the VM directly from the backup storage system.

10. The non-transitory machine-readable medium of claim 6, wherein the datastore is a Network File System (NFS) datastore.

11. A data processing system, comprising:
a processor; and
a memory coupled to the processor storing instructions which, when executed by the processor, cause the processor to perform recovery operations, the operations including:
determining whether a vMotion live migration has been completed for a virtual machine (VM) recovered through Instant Access from a backup storage system;
after the vMotion live migration has been completed, determining whether a datastore corresponding to a backup image of the VM on the backup storage system is empty, wherein in response to the datastore corresponding to the backup image of the VM on the backup storage system being not empty, a user is prompted to free up contents of the datastore;
in response to determining that the datastore corresponding to the backup image of the VM on the backup storage system is empty, removing automatically a mount point corresponding to the datastore, wherein prior to the removal of the mount point, the backup image was mounted at a production server over a network as the datastore at the mount point, wherein if the datastore corresponding to the backup image of the VM on the backup storage system and/or its contents is inaccessible, the mount point corresponding to the datastore is forcibly removed; and
after removing the mount point, freeing up storage space on the backup storage system corresponding to the datastore.

12. The data processing system of claim 11, wherein if the vMotion live migration has not been initiated, a user is prompted to initiate the vMotion live migration to migrate the backup image of the VM from the backup storage system the production server.

13. The data processing system of claim 11, wherein the recovered VM keeps running during the vMotion live migration.

14. The data processing system of claim 11, wherein Instant Access enables booting of the VM directly from the backup storage system.

15. The data processing system of claim 11, wherein the datastore is a Network File System (NFS) datastore.

* * * * *